US008848609B2

(12) United States Patent
Hsiao et al.

(10) Patent No.: US 8,848,609 B2
(45) Date of Patent: Sep. 30, 2014

(54) FORWARDING INTERNET PROTOCOL VERSION 6 LINK-LOCAL MULTICAST TO SUPPORT ROAMING OF WIRELESS MOBILE CLIENT DEVICES

(75) Inventors: Tao-Yuan Hsiao, San Jose, CA (US); Tak Ming Francis Pang, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 264 days.

(21) Appl. No.: 13/191,073

(22) Filed: Jul. 26, 2011

(65) Prior Publication Data

US 2013/0028163 A1 Jan. 31, 2013

(51) Int. Cl.
*H04W 4/00* (2009.01)
*H04W 4/06* (2009.01)
*H04W 76/04* (2009.01)
*H04W 8/18* (2009.01)

(52) U.S. Cl.
CPC .............. *H04W 4/06* (2013.01); *H04W 76/041* (2013.01); *H04W 8/186* (2013.01)
USPC .......................................... 370/328

(58) Field of Classification Search
USPC ................................. 370/310, 312
See application file for complete search history.

(56) References Cited

U.S. PATENT DOCUMENTS

| 7,873,020 | B2* | 1/2011 | Hunt et al. ............. | 370/338 |
| 7,936,752 | B2 | 5/2011 | Boers et al. | |
| 8,386,629 | B2* | 2/2013 | Tan et al. ................ | 709/231 |
| 2004/0158872 | A1* | 8/2004 | Kobayashi ............... | 725/120 |
| 2004/0240411 | A1* | 12/2004 | Suzuki ...................... | 370/331 |
| 2005/0013280 | A1* | 1/2005 | Buddhikot et al. ...... | 370/349 |
| 2009/0059816 | A1* | 3/2009 | Reza et al. .............. | 370/256 |
| 2010/0103856 | A1* | 4/2010 | Kim et al. ................ | 370/312 |
| 2011/0103284 | A1* | 5/2011 | Gundavelli et al. ..... | 370/312 |
| 2011/0149956 | A1* | 6/2011 | Alt et al. ................. | 370/352 |

\* cited by examiner

*Primary Examiner* — Anh-Vu Ly
*Assistant Examiner* — Gustavo Lopez-Vargas
(74) *Attorney, Agent, or Firm* — Edell, Shapiro & Finnan, LLC

(57) ABSTRACT

Techniques are provided for a foreign controller to receive a handoff message including information for a multicast group that is used to forward network control information originating from an Internet Protocol version 6 (IPv6) network router by a home wireless controller to one or more foreign wireless controllers for mobile client devices that were first associated with the home controller. The foreign controller joins a multicast group based on the information contained in the handoff message and establishes a communication path with a mobile client device. The foreign controller extracts network control information addressed to the mobile client device received from the home wireless controller via a multicast stream associated with the multicast group, and forwards the network control information to the mobile client device via the communication path.

28 Claims, 5 Drawing Sheets

Link-Local Multicast Stream ($S_{MA1}$, G)

FORWARDING INTERNET PROTOCOL VERSION 6 LINK-LOCAL MULTICAST TO SUPPORT ROAMING OF WIRELESS MOBILE CLIENT DEVICES

TECHNICAL FIELD

The present disclosure relates to control message routing in a network environment where wireless mobile client devices may roam from one wireless local area network device to another wireless local area network device.

BACKGROUND

Internet Protocol version 6 (IPv6) is the next-generation Internet working protocol version designated as the successor to IPv4. IPv4 is the first implementation used in the Internet and is still widely used. IPv6 has a vastly larger address space than IPv4. This results from the use of a 128-bit address, whereas IPv4 uses only 32 bits. This expansion provides flexibility in allocating addresses and routing traffic and eliminates the need for network address translation (NAT), which gained widespread deployment as an effort to alleviate IPv4 address exhaustion.

IPv6 does not implement traditional IPv4 broadcast and does not use any special broadcast address for transmitting a packet to all hosts on an attached physical link. IPv6 achieves a broadcast-like result by sending a packet to a link-local multicast group address. IPv6 uses link-local multicast to communicate application specific, management, or control information to client devices on the link-local multicast network. Since link-local multicast is local to a particular wireless local area network and wireless controller, link-local multicast packets are not forwarded to remote wireless controllers or networks. Applications such as multicast Domain Name Service (mDNS) and Universal Plug and Play (UPnP) stop working after a roaming client stops receiving their link-local multicast control information.

DESCRIPTION OF EXAMPLE EMBODIMENTS

Overview

Techniques are disclosed to establish a first communication path between a first wireless controller and a mobile client device in a first network, where the first communication path is used to send network control information originating from an Internet Protocol version 6 (IPv6) network router from the first wireless controller to the mobile client device. Roaming of the mobile client device from the first network to a second network is detected by a second wireless controller in the second network. A handoff message is transmitted from the first wireless controller to the second wireless controller. The handoff message comprises information for a multicast group that is used to forward the network control information by the first wireless controller to one or more secondary wireless controllers for mobile client devices that were first associated with the first wireless controller.

The handoff message is received at the second wireless controller. The second wireless controller joins a Source Specific Multicast (SSM) group based on the information contained in the handoff message. A second communication path is established between the second wireless controller and the mobile client device. The second wireless controller extracts the network control information addressed to the mobile client device received from the first wireless controller via an SSM multicast stream. The network control information is forwarded to the mobile client device via the second communication path.

Example Embodiments

Figure 1:
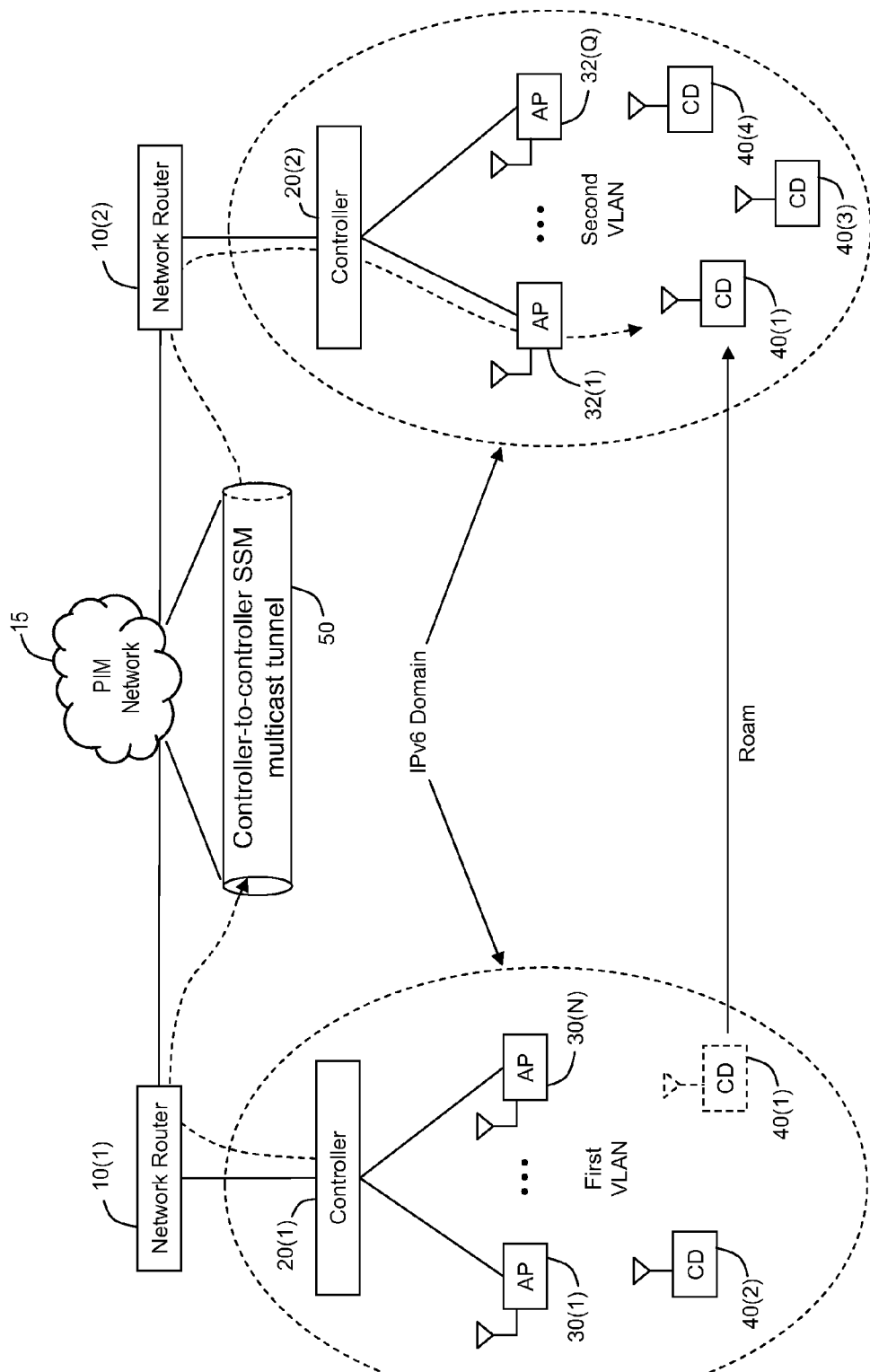
FIG. 1 is a block diagram of a communication network environment in which wireless mobile client devices may roam from one wireless access point to another and in which control messages are forwarded according to techniques described herein.

Reference is first made to FIG. 1 that shows a block diagram of a networking environment to which the techniques described herein are applicable. FIG. 1 generally depicts a configuration that is common in bridging a wired network with a wireless network. There is a first network router 10(1) on a first virtual local area network (VLAN), where a VLAN is defined logically as a different IPv6 subnet. The first network router 10(1) communicates with a first controller 20(1). The first network router 10(1) communicates, via a control and provisioning of wireless access point (CAPWAP) tunnel or other layer2/layer3 tunnel, with a first controller 20(1).

Similarly, there is a network router 10(2) that communicates with a second controller 20(2) that is associated with a second VLAN. The second controller 20(2) communicates with and controls APs 32(1)-32(Q), and these APs provide wireless connectivity with CDs 40(3) and 40(4), for example. Each of the controllers 20(1) and 20(2) may provide control functionality for multiples sets of APs and for a plurality of different VLANs. The controller 20(1) exchanges management or network control information with controller 20(2) over Multicast Routing Protocol (MRP) network, e.g., Protocol Independent Multicast (PIM) network 15 using a controller-to-controller SSM multicast tunnel 50 according to the techniques described herein. Local distribution of the network control information may be made by way Internet Group Management Protocol version 3 (IGMPv3) networks associated with each VLAN.

Briefly, an SSM address is used by the forwarding controller to forward network control information that is normally sent by way of link-local multicast to a receiving controller by way of an SSM tunnel, e.g., controller-to-controller SSM multicast tunnel 50. The receiving controller subscribes to the associated SSM stream and a CD specific identifier in the SSM stream delimits CD specific data by way of techniques described herein. Examples and details will be described in the text that follows.

In this example, the routers 10(1) and 10(2) are considered to be IPv6 routers and in this regard routers 10(1) and 10(2) service the IPv6 traffic to and from the CDs, e.g., CDs 40(1)-40(4), and also service the controller-to-controller exchange of network control information via controller-to-controller SSM multicast tunnel 50. With regard to the exchange of control information, the routers 10(1) and 10(2) may be IPv6 or IPv4 routers. However, as shown in FIG. 1 the first and second VLANs are IPv6 VLANs in the IPv6 domain as indicated by the dashed ovals around the VLANs. Should the routers 10(1) and 10(2) be IPv4 routers, then separate IPv6 routers would be used to route CD traffic through the controllers. In other words, the controllers 20(1) and 20(2) may be connected to a plurality of routers with at least one router that is IPv6-capable.

The CDs shown in FIG. 1 may be mobile and thus move between coverage areas of APs. Each VLAN has a different IPv6 subnet/prefix. When a CD first attaches (or in WLAN parlance "associates") with any of the wireless APs controlled by one of the controllers 20(1) or 20(2), the CD will be made part of that VLAN (IPv6 subnet) which that AP or an associated switch is configured to serve. The CD then is said to belong to or is a part of that VLAN or subnet. As part of creating this association between the CD and the VLAN, unique IPv6 addresses are assigned to the CD using the aggregate prefix block (subnet block) allocated to the VLAN. When the CD's state is removed, these addresses are released and recycled. The controller controlling that AP for the first point of attachment becomes the "home" controller for that CD.

Assuming for the sake of an example that CDs 40(1) and 40(2) first enter the mobility or wireless network domain at one of the APs 30(1)-30(N), and then these CDs are assigned an IPv6 address with a subnet prefix that corresponds to a subnet prefix assigned to the network router 10(1). Specifically, the controller 20(1) allocates an IPv6 subnet prefix of network router 10(1) as the network prefix for CDs 40(1) and 40(2). The controller at which the CD initially enters the mobility domain stores entry information for that CD comprising a media access control (MAC) address for the CD, an assigned IPv6 home network prefix, and a home controller ID (e.g., ID for controller 20(1)). Thus, the VLAN for CDs 40(1) and 40(2) is the first VLAN under control of the controller 20(1) and corresponding to network router 10(1). Once this initial VLAN assignment is made, the CDs 40(1) and 40(2) will always be part of the first VLAN and all other controllers (and APs) will store data indicating that association. A CD can obtain one or more IPv6 network addresses from the prefix corresponding to its initial VLAN it discovers when entering the mobility domain, and can retain those addresses even after moving anywhere within the mobility domain. Consequently, with respect to CDs 40(1) and 40(2), the second controller 20(2) is referred to as a "foreign" controller because it controls APs that are configured to serve CDs in other VLANs.

The first controller 20(1) communicates with and controls a plurality of wireless LAN (WLAN) access points (APs) 30(1)-30(N) via CAPWAP or other Layer2/Layer3 tunnels. The first controller 20(1) serves as a bridge between the wired network of which the network router 10(1) is a part and the wireless network served by the APs 30(1)-30(N). The APs 30(1)-30(N) provide wireless connectivity with wireless client devices (CDs), an example of which are shown at reference numerals 40(1) and 40(2).

The first controller 20(1) controls the APs 30(1)-30(N) which serve CDs that belong to a particular subnet and thus may be said to belong to a first VLAN insofar as they are associated with a unique IPv6 subnet served by network router 10(1). Likewise, the second controller 20(2) controls the APs 32(1)-32(Q) which serve CDs that belong to a second subnet and thus belong to a second VLAN served by network router 10(2). The controllers 20(1) and 20(2) are, for example, wireless LAN controller devices that are configured to provide a management point for a group of APs, and to route traffic between the wired and wireless networks. An AP may be said to host a VLAN in that it serves CDs that belong to that VLAN. Multiple APs under control of the same controller may host the same VLAN in that those multiple APs may serve CDs in the same VLAN. When a CD roams from one AP to another AP, the CD may attach to an AP that is not responsible for hosting that CD's VLAN. In this example, CD 40(1) is shown roaming from a first VLAN to a second VLAN.

The home controller, i.e., the first controller 20(1), broadcasts network control information that originates from network router 10(1) to CDs associated with APs under the home controller's control by way of an IPv6 link-local multicast group. When a CD roams from one WLAN to another, e.g., when CD 40(1) roams from the first VLAN to the second VLAN, the CD can no longer receive link-local multicast group traffic. It is of note that CDs that roam, e.g., CD 40(1), maintain their original IPv6 addresses from their first VLAN after roaming. There is currently no IPv6 mechanism for CD 40(1)'s home controller, e.g., controller 20(1), to broadcast IPv6 link-local multicast traffic from an originating IPv6 router to CDs that have roamed, e.g., CD 40(1). As such, applications that require network control information such as UPnP or mDNSv6 cease to function after a CD has roamed.

The challenges of developing a scalable forwarding solution for link-local multicast forwarding from one controller to multiple remote controllers include: 1) as the numbers of CDs, WLANs, and wireless controllers increase, directly unicasting home link-local multicast from one controller to another creates many one-to-one (or many-to-many) unicast relationships that becomes exponentially difficult to manage, 2) global multicasting of link-local multicast of multiple WLANs of a controller to all other controllers is not scalable because that scheme would require a single multicast destination address per controller, and therefore, requires a large number of IP multicast addresses and a sophisticated destination address distribution system, and 3) multiplexing the link-local multicast of the multiple home link-local networks of a controller into a single multicast stream can require expensive de-multiplexing at the receiver.

According to the techniques described herein, link-local multicast traffic can be sent to CD 40(1) using the controller-to-controller SSM tunnel 50 that is set up between controller 20(1) and controller 20(2). Link-local multicast data sent to CD 40(1) after CD 40(1) has roamed is shown by the dashed line from controller 20(1) to CD 40(1). Even though CD 40(1) maintains its original IPv6 address from first VLAN after roaming to the second VLAN, the controllers 20(1) and 20(2) are able to provide link-local multicast data to CD 40(1) as if it had not roamed.

There may be network switches between the APs and the controller for a given WLAN and switches between controllers and network routers. It is to be further understood that the configuration shown in FIG. 1 is a very simple representation and that there are, in practice, many more controllers and VLANs in any given network environment. Furthermore, the term "AP" or wireless access point device is meant to refer to any wireless device that provides wireless connectivity in a wireless network, and is not to be limited to, for example, WiFi™ (IEEE 802.11) APs. For example the techniques described herein are applicable to other wireless networks, such as a WiMAX™ (IEEE 802.16) wireless network, where devices known as base stations in WiMAX parlance perform functions similar to that of an AP in an IEEE 802.11 wireless network. Likewise, the term "controller" or "WLAN controller" is meant to refer to any control apparatus that controls a wireless device that provides wireless connectivity in wireless network, and includes for example, a wireless gateway device. A WiMAX wireless network is only one example of other wireless networks to which these techniques are applicable. Thus, the configuration shown in FIG. 1 is only meant to be an example for purposes of describing the techniques herein.

The controllers 20(1) and 20(2), via the aforementioned CAPWAP or other layer-2/layer-3 tunnels, communicate with each other in order to share information as to the VLAN of each CD that has entered the mobility domain in the network. In addition, through these same tunnels, when a CD roams from a first AP to a second AP that is controlled by a different controller, the controller for the second AP to which it roams shares information with the controller for the first AP. In this way, at any given time, controller 20(1) stores "mobility data" that comprises information identifying all other controllers that controls APs to which at least one CD has roamed from. The same applies to controller 20(2) for all CDs that belong to the second VLAN. Moreover, each controller 20(1) and 20(2) stores information identifying each of the one or more APs that it controls.

Figure 2:
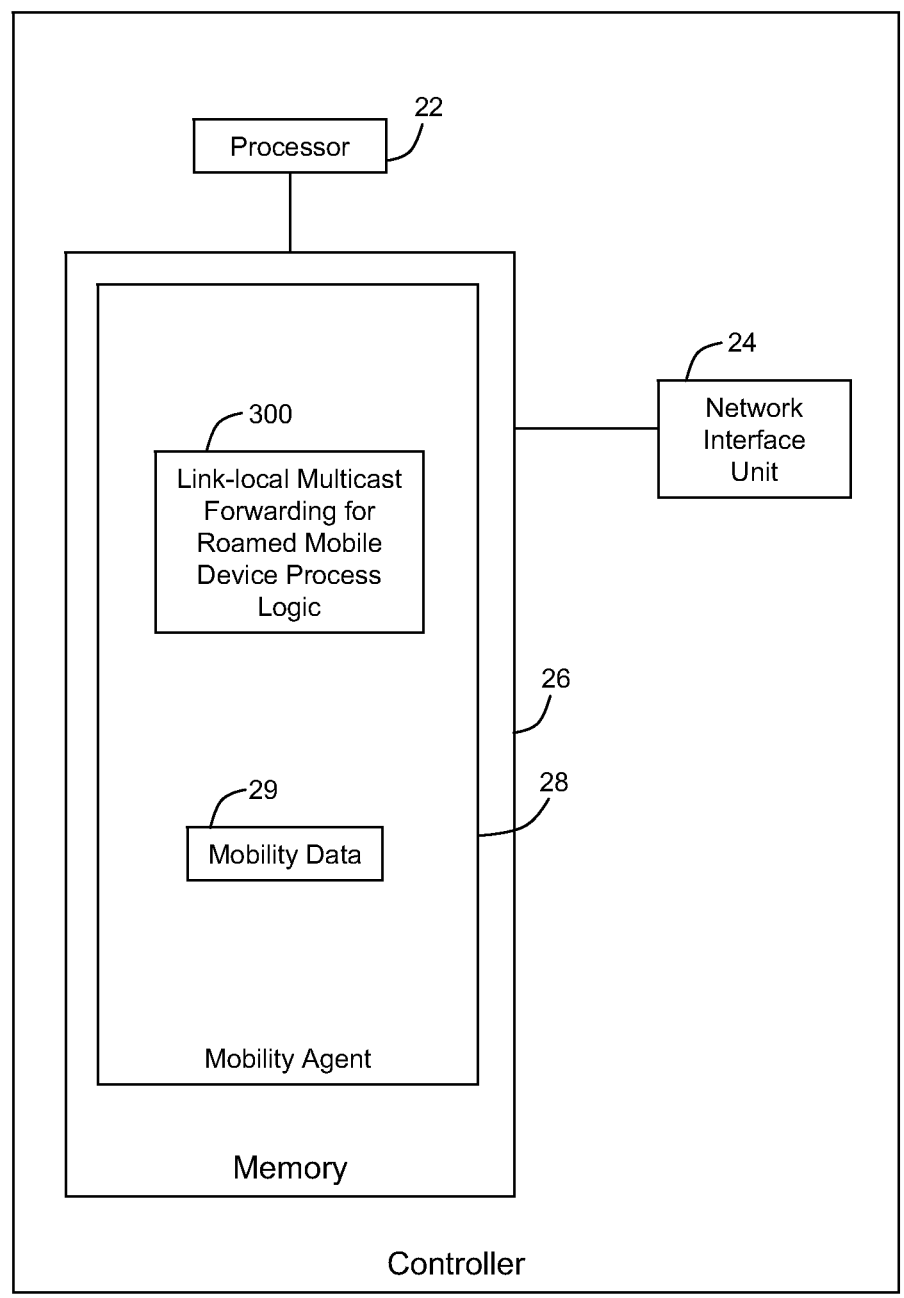
FIG. 2 is a block diagram for a controller that is configured to forward control messages according to techniques described herein.

Referring now to FIG. 2, a block diagram is shown that is meant to represent an example of a block diagram for the controllers 20(1) and 20(2), which are configured to perform the link-local multicast forwarding techniques described herein. There is a processor 22, a network interface unit 24 and a memory 26. The processor 22 is for example, a microprocessor, a microcontroller, a digital signal processor, etc. The network interface unit 24 is a device that is configured to enable communications over a wired or wireless network according to any of a variety of networking protocols.

The memory 26 is a tangible processor readable or computer readable storage media (e.g., memory device) that stores or encoded with instructions that, when executed by the processor 22, cause the processor 22 to perform functions described herein. The memory 26 may comprise read only memory (ROM), random access memory (RAM), magnetic disk storage media devices, optical storage media devices, flash memory devices, electrical, optical, or other physical/tangible memory storage devices. The processor 22 is, for example, a microprocessor or microcontroller that executes instructions stored in memory 26. Thus, in general, the memory 26 may comprise one or more computer readable storage media (e.g., a memory device) encoded with software comprising computer executable instructions and when the software is executed (by the processor 22) it is operable to perform the operations described herein. For example, the memory 26 is encoded with instructions for a mobility agent 28 and for link-local multicast forwarding for roamed mobile device process logic 300. The mobility agent 28 manages mobility information for the controller whether acting as a home controller or a foreign controller. The process logic 300 is described hereinafter in connection with FIGS. 3A, 3B, and 4.

While FIG. 2 shows a processing environment comprising a data processor 22 that executes software stored in memory 26, an alternative processing environment is a fixed data processing element, such as an application specific integrated circuit (ASIC) that is configured, through fixed hardware logic, to perform the functions of the logic 300. Yet another possible data processing environment is one involving one or more field programmable logic devices, or a combination of fixed processing elements and programmable logic devices.

The memory 26 also stores the aforementioned mobility data shown at reference numeral 29. Again, the mobility data 29 comprises data concerning the home VLAN for CDs and current points of attachment of CDs (i.e., IDs for foreign controllers where a CD is currently attached). In addition, the memory 26 also stores AP IDs for all APs under its control. Any of the devices, e.g., APs, CDs, or routers, shown in the figures may use some or all of the components as those described for a controller in connection with FIG. 2. The wireless devices may employ a network interface unit with wireless capability.

Figure 3A:
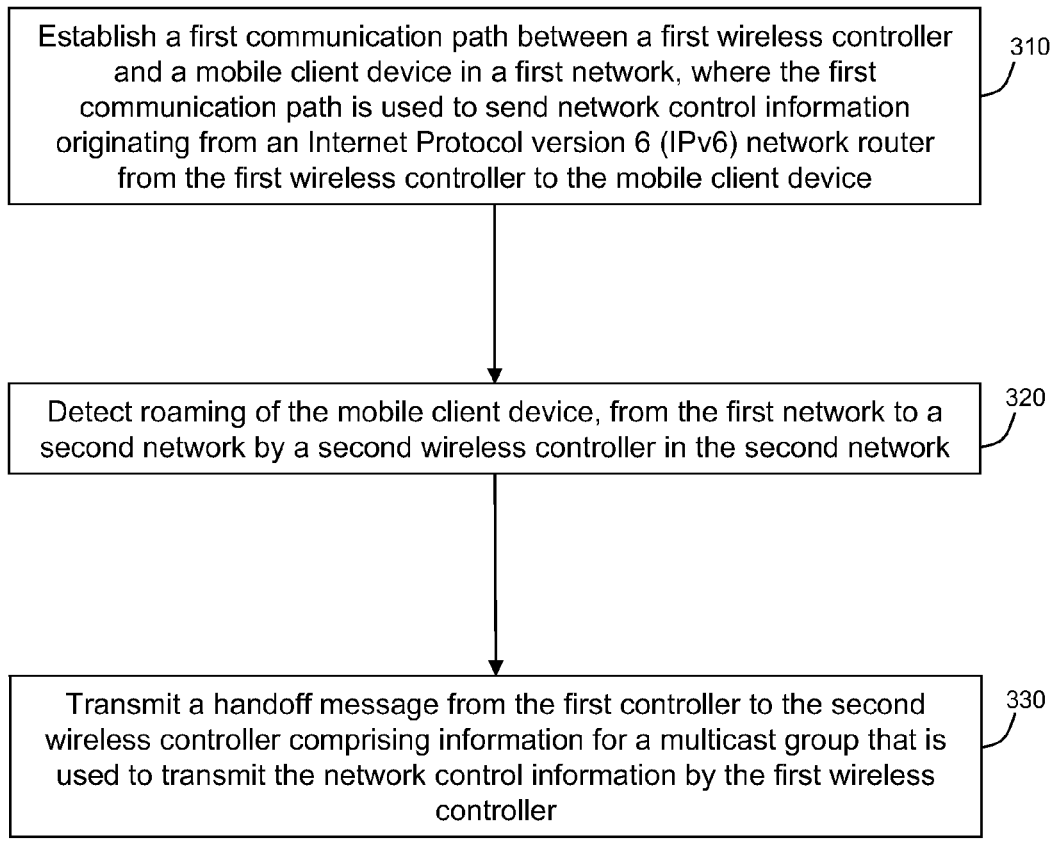
FIG. 3A is a flow chart depicting a control message forwarding process performed in a first wireless access point controller to forward IPv6 link-local multicast control messages to individual wireless mobile client devices that were initially associated with the first wireless access point, but have roamed.
Figure 3B:
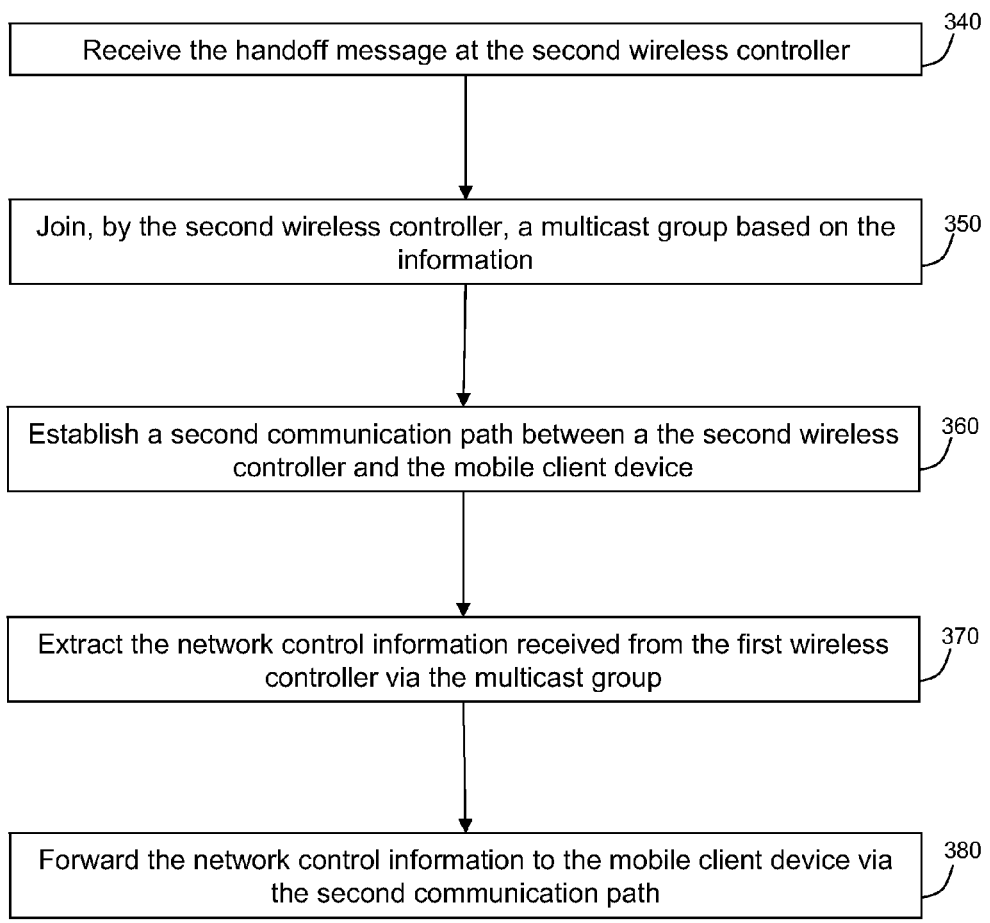
FIG. 3B is a flow chart depicting a control message receiving process performed in a second wireless controller to forward IPv6 link-local multicast control messages from the first wireless controller to individual wireless mobile client devices served by the second wireless controller.

Turning to FIGS. 3A and 3B, a flow chart is described for the link-local multicast forwarding for roamed mobile device process logic 300. FIG. 3A depicts elements for process 300 with respect to a home controller, e.g., controller 20(1), while FIG. 3B depicts elements for process 300 with respect to a foreign controller, e.g., controller 20(2), from the perspective of a particular CD, e.g., CD 40(1). At 310, a first communication path is established between a first wireless controller and a mobile client device in a first network, wherein the first communication path is used to send control or management information from the first wireless controller to the mobile client device. This communication path uses link-local multicast techniques to broadcast the network control information originating from an IPv6 network router. At 320, roaming of the mobile client device from the first network to a second network is detected by a second wireless controller in the second network. At 330, a handoff message is transmitted from the first wireless controller to the second wireless controller. The handoff message comprises information for a multicast group that is used to forward network control information by the first wireless controller to one or more secondary wireless controllers for mobile client devices that were first associated with the first controller.

The description that follows uses standard IGMP notation (S, G), where S is the multicast stream source IPv6 address and G is the multicast group IPv6 address. Any upper layer protocol module that has joined or subscribed to (*, G) will receive the G addressed datagrams, i.e., each (*, G) socket receives the stream, where * indicates a wildcard address which is considered an SSM address when used with the techniques described herein.

An IP SSM address is allocated to the forwarding controller for forwarding the IPv6 link-local multicast for the first communication path source address for the home controllers. For ease of explanation, the mobility agent (MA), e.g. mobility agent 28, associated with the first controller is referred to herein as MA1, or as the controller/MA combination as controller MA1, while the mobility agent associated with the second controller is referred to herein as MA2 or controller MA2. When a CD roams from a network controller, e.g., controller 20(1), MA1 to foreign controller MA2, controller MA2 will join the SSM stream ($S_{MA1}$, G). In this manner, only foreign controllers interested in MA1 link-local multicast will subscribe to the traffic from MA1.

The mobility handoff message from controller MA1 to MA2 includes information that may be used to uniquely identify network control information for the CD. For example, the mobility handoff message may include information comprising a VLAN identifier (ID), a unique network ID (e.g., a bridge domain ID), and a link-local multicast group address (G)). Based on the information, both MA1 and MA2 derive a single and unique global multicast group identifier (MGID) tag denoted as M. The MGID is generated using an algorithm that is known to controllers configured with process logic 300. The MGID is stored along with the associated CD for which the handoff message was received. The MGID is not generated based on CD information. Accordingly, the same MGID may be used for plural CDs that have roamed from the same controller and VLAN to different VLANs associated with different foreign controllers.

The bridge domain ID is included in the handoff message to distinguish source or home VLANs from foreign VLANs. VLAN identifiers may be randomly selected, e.g., VLAN 6 or VLAN 100, or arbitrarily assigned. For example, the first VLAN and the second VLAN identified in FIG. 1 may coincidentally have the same VLAN ID, e.g., VLAN 1. In such cases the MGID can not be made unique unless the bridge identifier for a controller, e.g., controller 20(1), or some other unique piece of information is included in the handoff message.

Figure 4:
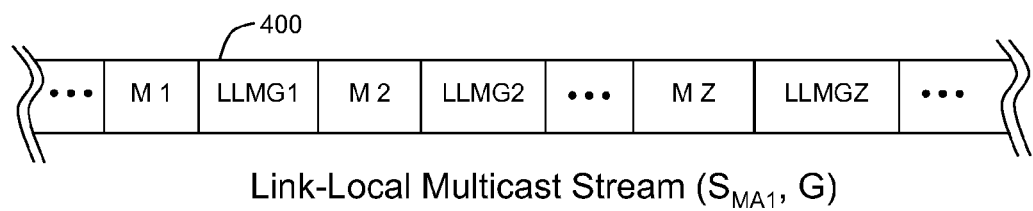
FIG. 4 is an example of data in a multicast stream used to forward IPv6 link-local multicast information according to techniques described herein.

The MGID is attached to packets of the multicast stream, e.g., into SSM stream $(S_{MA1}, G)$. The MGID is used to distinguish between the multiple VLANs or subnets that the controller is managing. As a result, the controller can multiplex network control information from multiple IPv6 networks into a single SSM stream that any foreign controller can subscribe to. The home controller, e.g., MA1, tunnels link-local multicast packets to an SSM tunnel, e.g., $(S_{MA1}, G)$ via controller-to-controller SSM tunnel 50, and may embed the MGID M in the payload header. An example SSM stream is illustrated in FIG. 4. FIG. 4 depicts an SSM stream 400 that is generated by a single controller MA, e.g., MA1. Stream 400 comprises a plurality of MGIDs labeled from MGID 1 to MGID Z. Following the MGID is the associated link-local multicast group (LLMG) data, e.g., LLMG1, LLMG2 . . . LLMG Z. The data need not be arranged in order, i.e., MGIDs and associated data may be transmitted in any order as the data become available.

The global MGID may be sized in bytes, e.g., 1-8 bytes, to accommodate as many MGIDs per switch/VLAN/link-local multicast groups that are anticipated. In one example, 12 bits of the MGID may be used to support approximately 4000 VLANs on a given switching network. Seven bits of the MGID can support 128 bridge ID/domains and 8 bits of the MGID can identify current and future IPv6 link-local applications. Currently there are about 30 known link-local multicast applications. When a link-local multicast is used, the multicast destination address may indicate a specific application. For example, the address FF02:0:0:0:0:0:0:F is associated with UPnP and the address FF02:0:0:0:0:0:0:FB is associated with multicast Domain Name Service mDNS. This associated application address can be converted to a bit field within the MGID.

The MGIDs may be stored in an MGID table on the controller (or at a convenient storage location) for any active CDs that are associated to an AP being serviced by that controller. The MGID will be used by the servicing controller, e.g., controller MA2, to identify the link-local multicast payload in the SSM stream as described above. Once the link-local multicast payload is identified, MA2 by way of an AP converts the multicast stream to unicast for direct forwarding of the link-local information to individual roaming CDs.

In some network environments hardware assisted forwarding is employed, e.g., ASICs may act as forwarding engines that perform packet addressing and rewrites in hardware. In these cases, the processors, e.g., processor 22, of MAs loaded on devices that employ hardware forwarding engines, plumb down the MGID to the hardware level. Accordingly, hardware fast-forwarding and receiving may be used by home and foreign controllers, whether the controllers are using electrical or optical physical layers. Payloads for different MGIDs may also be sent in $(S_{MA1}, G)$ and tagged with different User Datagram Protocol (UDP) ports for fast filtering at the destination.

The process continues with respect to a foreign controller in FIG. 3B. At 340, the handoff message is received at the second wireless controller. At 350, the second wireless controller joins a multicast group based on the information contained in the handoff message. For example, the foreign controller, e.g., MA2, receives the link-local traffic by subscribing to the corresponding SSM stream, e.g., $(S_{MA1}, G)$. The information contained in the handoff message may be obtained from the mobile client device. In other words, $S_{MA1}$ may be received from either the first controller or the mobile client device, while G may be known to the network, i.e., pre-configured, or G may be established at run-time. Duplicate subscriptions for the same global MGID of the same (VLAN, bridge domain ID, link-local multicast group) can be eliminated by the home controller, e.g., MA1, by cross-checking the local MGID table, before sending duplicate data in $(S_{MA1}, G)$. At 360, a second communication path is established between the second wireless controller and the mobile client device.

Although the term "path" has been used herein with regard to the first and second communication paths from the first and second controllers to the mobile client device, it is to be understood that their may be many physical communications links from the controller to the mobile client device. For example, the path may comprise one or more wired or wireless physical links from the controller to the AP, e.g., MA1 to AP, and a wireless physical link from the AP to the mobile client device. Hence, the term "path" is meant to encompass all of the links that are required to establish the requisite communications.

At 370, the second wireless controller extracts the network control information for the mobile client device received from the first wireless controller via a SSM multicast stream. When hardware acceleration is used, the MA2 forwarding engine identifies the link-local multicast payload by filtering on the MGID in the packet header, swaps the payload packet IP header with MA2 and MA2/AP addresses, and sends the payload to the AP. At 380, the network control information is forwarded to the mobile client device via the second communication path. The AP of the foreign controller, e.g., MA2, looks at the global MGID and client list mapping, and then converts the steam in order to unicast the link-local multicast information to a corresponding roaming client as described above.

In summary, techniques are described herein to establish a first communication path between a first wireless controller and a mobile client device in a first network, where the first communication path is used to send network control information from the first wireless controller to the mobile client device. Roaming of the mobile client device from the first network to a second network is detected by a second wireless controller in the second network. A handoff message is transmitted from the first wireless controller to the second wireless controller. The handoff message comprises information for a multicast group that is used to forward network control information by the first wireless controller to one or more secondary wireless controllers for mobile client devices that were first associated with the first controller.

The handoff message is received at the second wireless controller. The second wireless controller joins a multicast group based on the information contained in the handoff message. A second communication path is established between the second wireless controller and the mobile client device. The second wireless controller extracts the network control information addressed to the mobile client device received from the first wireless controller via the SSM multicast stream. The network control information is forwarded to the mobile client device via the second communication path.

The handoff message may contain multicast group information comprising a virtual local area network identifier, a unique identifier for the first wireless controller or bridge domain identifier used by the first wireless controller, and a link-local multicast group address. A multicast group identifier is generated at the first and second wireless controllers that configured to identify the network control information for the mobile client device within the multicast stream based on the virtual local area network identifier, the bridge domain identifier, and the link-local multicast group address using a predetermined algorithm. The multicast group identifier is stored at each of the first and second wireless controllers. The first network may be considered a home network that was once used by the mobile client device and managed by the first controller which may be considered the home controller. Accordingly, the bridge domain identifier may be considered a bridge domain identifier used by the home controller.

The multicast group identifier is inserted into payload header of the SSM multicast stream by the first wireless controller in order for the second wireless controller to identify the network control information for the mobile client device within the multicast stream. The network control information is extracted based on the multicast group identifier by the second wireless controller.

The multicast group identifier may be associated with a corresponding identifier, e.g., a UDP port, for filtering at the destination. The second wireless controller converts a packet address in the multicast stream to an address associated with the second wireless controller and a wireless access point address based on the multicast group identifier. The wireless access point further converts the multicast stream to a unicast stream for transmission to the mobile client device.

The second wireless controller joins the SSM multicast group of the source address of the first wireless controller and a pre-defined (or configurable) SSM destination multicast group address. The unicast IP address of the first wireless controller comprises an SSM source address and an IP multicast group address comprises the SSM destination group address. A SSM tunnel is created from the first wireless controller to the second wireless controller in order to send the multicast stream.

The SSM address is used to forward IPv6 link-local multicast from home to foreign controllers and networks. The SSM destination address is a global IP multicast address, and the source addresses are the addresses of the home controllers. Link-local multicast for a roamed wireless client is added to the multicast stream on-demand when home controller is informed of the roaming event. The foreign controller can obtain the home controller's address from the wireless client or via mobility handoff message exchange. The home controller can put link-local multicast of different local networks into different UDP streams for seamless filtering at remote foreign controllers. The foreign controller and AP of attachment perform any address conversions to unicast the link-local multicast information from the home network to the roaming CD.

There are no techniques heretofore known for extending IPv6 link-local multicast beyond wireless local area networks (WLANs) to provide mobility support for mobile client devices that have roamed to another WLAN. The techniques described herein allow an IPv6 wireless mobile client device to be part of an enterprise virtual local area network (VLAN) and to change its point of attachment to a different wireless access point and still receive information from its home controller's IPv6 link-local multicast group.

The techniques described herein provide several advantages. For example, using SSM to distribute IPv6 link-local multicast only requires a single global multicast address for forwarding the link-local information. The IP address of the controller is used as the SSM source address. Accordingly, this scheme is relatively easy to manage and is scalable when compared to any alternatives. It eliminates the drawbacks of designs that require direct unicasting or multiple multicast addresses. The use of multiple UDP streams within a single SSM stream allows a remote controller to efficiently filter out link-local data that is intended for other foreign controllers.

Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:

1. A method comprising:
receiving a handoff message at a second wireless controller in a second Internet Protocol version 6 (IPv6) domain from a first wireless controller in a first IPv6 domain, the handoff message comprising information for a multicast group that is used to forward network control information originating from an IPv6 network router of the first IPv6 domain, wherein the network control information is intended for a mobile client device that was first associated with the first wireless controller and has roamed to the second IPv6 domain, wherein the information for the multicast group comprises a virtual local area network identifier, a network identifier that uniquely identifies a network associated with the first network controller, and a link-local multicast group address;
joining, by the second wireless controller, a multicast group based on the information contained in the handoff message;
establishing a communication path between the second wireless controller and the mobile client device within the second IPv6 domain;
extracting by the second wireless controller network control information for the mobile client device received from the first wireless controller via a multicast stream associated with the multicast group; and
forwarding the network control information to the mobile client device via the communication path within the second IPv6 domain.

2. The method of claim 1, wherein receiving comprises receiving the handoff message with multicast group information comprising information configured to identify the network control information in the multicast stream.

3. The method of claim 1, further comprising generating at the second wireless controller a multicast group identifier configured to identify the network control information for the mobile client device within the multicast stream based on the virtual local area network identifier, the network identifier, and the link-local multicast group address.

4. The method of claim 3, further comprising storing the multicast group identifier at one or more of the second wireless controller and a wireless access point serving the mobile client device.

5. The method of claim 3, wherein the multicast stream comprises the multicast group identifier in order for the second wireless controller to identify the network control information for the mobile client device within the multicast stream; and
    wherein extracting comprises extracting the network control information based on the multicast group identifier.

6. The method of claim 3, further comprising associating the multicast group identifier with a corresponding User Datagram Port identifier.

7. The method of claim 3, further comprising at the second wireless controller converting a packet address in the multicast stream to an address associated with the second wireless controller and a wireless access point address based on the multicast group identifier.

8. The method of claim 7, further comprising at the wireless access point converting the multicast stream to a unicast stream for transmission to the mobile client device.

9. The method of claim 1, wherein joining comprises joining the multicast group comprising an address of the first wireless controller and a known multicast group address.

10. The method of claim 1, wherein receiving comprises receiving the handoff message from the mobile client device.

11. The method of claim 1, further comprising creating a Source Specific Multicast (SSM) tunnel from the first wireless controller to the second wireless controller in order to send the multicast stream.

12. An apparatus comprising:
    a network interface unit configured to send and receive messages over a wired network including in a second Internet Protocol version 6 (IPv6) domain;
    a processor configured to:
        receive, via the network interface unit, a handoff message comprising information for a multicast group that is used to forward network control information originating from an IPv6 network router via a home wireless controller of a first IPv6 domain to one or more foreign wireless controllers of the second IPv6 domain for mobile client devices that were first associated with the home controller and have roamed to the second IPv6 domain, wherein the information for the multicast group comprises a virtual local area network identifier, a network identifier that uniquely identifies the home controller, and a link-local multicast group address;
        join a multicast group based on the information contained in the handoff message;
        establish a communication path with a mobile client device within the second IPv6 domain;
        extract network control information for the mobile client device received from the home wireless controller via a multicast stream associated with the multicast group; and
        forward, via the network interface unit, the network control information to the mobile client device via the communication path within the second IPv6 domain.

13. The apparatus of claim 12, wherein the processor is configured to join the multicast group comprising an address of the home wireless controller and a known multicast group address.

14. The apparatus of claim 12, wherein the processor is configured to receive the handoff message from the mobile client device.

15. The apparatus of claim 12, wherein the processor is further configured to generate a multicast group identifier configured to identify the network control information for the mobile client device within the multicast stream based on the virtual local area network identifier, the network identifier, and the link-local multicast group address.

16. The apparatus of claim 15, wherein the processor is further configured to identify the network control information for the mobile client device within the multicast stream and to extract the network control information based on the multicast group identifier.

17. The apparatus of claim 15, wherein the processor is further configured to convert a packet address in the multicast stream to an address associated with the apparatus and a wireless access point address based on the multicast group identifier.

18. A system comprising the apparatus of claim 17 and the wireless access point, wherein the wireless access point is configured to convert the multicast stream to a unicast stream for transmission to the mobile client device.

19. One or more non-transitory computer readable storage media encoded with software instructions that when executed are operable to:
    receive a handoff message comprising information for a multicast group that is used to forward network control information originating from an Internet Protocol version 6 (IPv6) network router via a home wireless controller in a first IPv6 domain to one or more foreign wireless controllers in a second IPv6 domain for mobile client devices that were first associated with the home controller and have roamed to the second IPv6 domain, wherein the information for the multicast group comprises a virtual local area network identifier, a network identifier that uniquely identifies the home controller, and a link-local multicast group address;
    join a multicast group based on the information contained in the handoff message;
    establish a communication path with a mobile client device within the second IPv6 domain;
    extract network control information for the mobile client device received from the home wireless controller via a multicast stream associated with the multicast group; and
    forward the network control information to the mobile client device via the communication path within the second IPv6 domain.

20. The non-transitory computer readable storage media of claim 19, wherein the instructions that are operable to join comprise instructions operable to join the multicast group comprising an address of the home wireless controller and a known multicast group address.

21. The non-transitory computer readable storage media of claim 20, wherein the instructions that are operable to receive comprise instructions operable to receive the handoff message from the mobile client device.

22. The non-transitory computer readable storage media of claim 21, further comprising instructions that when executed are operable to:
    generate a multicast group identifier configured to identify the network control information for the mobile client device within the multicast stream based on the virtual local area network identifier, the network identifier, and the link-local multicast group address using a predetermined algorithm; and
    identify the network control information for the mobile client device within the multicast stream; and
    wherein the instructions that are operable to extract comprise instructions operable to extract the network control information based on the multicast group identifier.

23. A method comprising:
establishing a communication path between a first wireless controller and a mobile client device in a first Internet Protocol version 6 (IPv6) domain, wherein the communication path is used to send network control information originating from an IPv6 network router via the first wireless controller to the mobile client device;
detecting roaming of the mobile client device from the first IPv6 domain to a second IPv6 domain; and
transmitting a handoff message from the first wireless controller to a second wireless controller, the handoff message comprising information for a multicast group that is used to forward network control information by the first wireless controller to the second wireless controller for mobile client devices that were first associated with the first wireless controller and have roamed to the second IPv6 domain, wherein the information for the multicast group comprises a virtual local area network identifier, a network identifier that uniquely identifies the first network, and a link-local multicast group address.

24. The method of claim 23, further comprising generating at the first wireless controller a multicast group identifier configured to identify the network control information for the mobile client device within the multicast stream based on the virtual local area network identifier, the network identifier, and the link-local multicast group address.

25. The method of claim 24, further comprising storing the multicast group identifier at the first wireless controller.

26. The method of claim 24, further comprising inserting the multicast group identifier into the multicast stream by the first wireless controller in order for the second wireless controller to identify the network control information for the mobile client device within the multicast stream.

27. The method of claim 24, wherein inserting comprises inserting the multicast group identifier into a payload header.

28. The method of claim 24, further comprising associating the multicast group identifier with a corresponding User Datagram Port identifier.

* * * * *